S. GARDINER, Jr.
LIGHTING GAS BY ELECTRICITY.
No. 45,239. Patented Nov. 29, 1864.
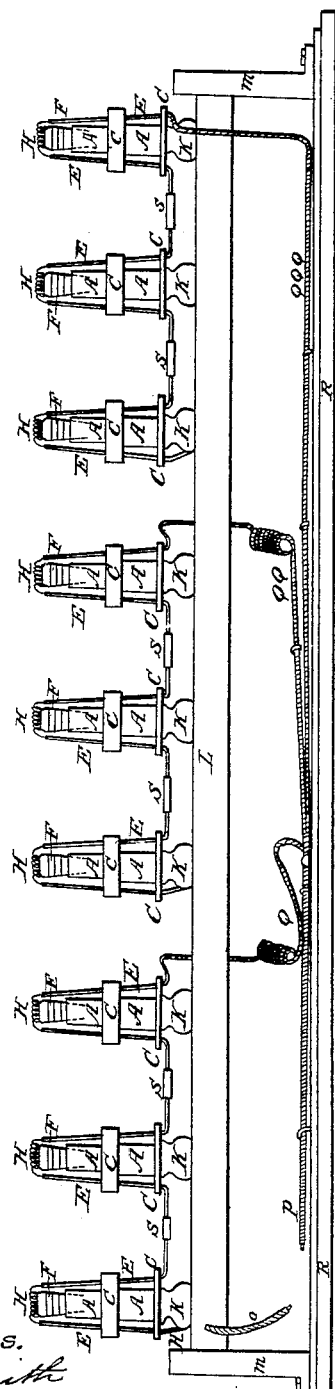
Witnesses.
Inventor:

UNITED STATES PATENT OFFICE.

SAMUEL GARDINER, JR., OF NEW YORK, N. Y.

IMPROVEMENT IN LIGHTING GAS BY ELECTRICITY.

Specification forming part of Letters Patent No. 45,239, dated November 29, 1864.

*To all whom it may concern:*

Be it known that I, SAMUEL S. GARDINER, Jr., of the city, county, and State of New York, have invented certain new and useful Improvements in Lighting Illuminating-Gas by Electricity; and I do hereby declare that the following is a full, clear, and exact description of the same, reference being had to the accompanying drawings, making part of this specification.

The object of this invention is to divide the current of electricity generated by a galvanic battery at or near the gas-burners to be lighted.

There is great difficulty in lighting a large number of gas-burners by passing one continuous current of electricity through a number of platina coils, the resistance being so great that the galvanic battery could not act or generate the electricity to its full extent; and in order to overcome that difficulty I have found by experiment that to divide the current by having several smaller wires leading from the main conducting-wire to several sections of gas-burners to be lighted, that I could light a much larger number of gas-burners by the same current of electricity generated by the galvanic battery. By actual experiment I have found that, where I could light but ten gas-burners by having only one continuous current, by dividing the current into ten sections I could light one hundred gas-burners by the same current passing over the main conducting-wire from the galvanic battery.

Figure A, No. 1, shows nine gas-burners placed on a gas-pipe, with the arrangement of the main conducting-wires, and showing the division of the current and application to the gas-burners.

Similar letters of reference indicate corresponding parts in Fig. A, No. 1.

To enable others skilled in the art to make and use my invention, I will proceed to describe the construction and operation of the same.

R is the base-board. M are the supports which hold the gas-pipe L. A is the gas-burner. F is the lava tip. H are the platina coils. E E are the conducting-wires, passing up the sides of the gas-burners and through the isolators c. S are the binders which connect the conducting-wires from one burner to the other. P is the main conducting-wire from the galvanic battery. Q is one section of the conducting-wire to the gas-burners.

A portion of the wire is put into a coil so as to be compact. The current of electricity passes through the main conducting-wire P, through the wire Q, passing up the conducting-wire of the gas-burner and through the three platina coils, and returns into the gas-pipe at H, which gas-pipe is connected to one of the poles of the galvanic battery by the return-wire O; also, in Q Q is another section of conducting-wire, coiled the same as in conducting-wire Q, leading from the main wire of the galvanic battery, which must be of the same length as in section Q. Q Q Q is still another section of conducting-wire from the main wire, leading to the galvanic battery, which is also of the same length of the sections Q and Q Q, all of which pass through the platina coils and return into the gas-pipe at H, which is connected to one of the poles of the galvanic battery by the main wire. (Marked O.)

Having thus described the construction and operation of my invention, I claim—

Dividing the current of electricity generated by a galvanic battery into several circuits, as herein specified, for the purpose of lighting a large number of gas-burners by electricity.

In testimony of which invention I hereunto set my hand.

SAML. GARDINER, JR.

Attest:
 OCTAVIUS KNIGHT,
 EDM. F. BROWN,